United States Patent
Hirose (10) Patent No.: US 11,743,579 B2
(45) Date of Patent: Aug. 29, 2023

(54) CONTROL DEVICE AND MEDICAL OBSERVATION SYSTEM

(71) Applicant: Sony Olympus Medical Solutions Inc., Tokyo (JP)

(72) Inventor: Kenji Hirose, Tokyo (JP)

(73) Assignee: SONY OLYMPUS MEDICAL SOLUTIONS INC., Tokyo (JP)

(*) Notice: Subject to any disclaimer, the term of this patent is extended or adjusted under 35 U.S.C. 154(b) by 286 days.

(21) Appl. No.: 17/180,890

(22) Filed: Feb. 22, 2021

(65) Prior Publication Data
US 2021/0297577 A1 Sep. 23, 2021

(30) Foreign Application Priority Data

Mar. 17, 2020 (JP) ................................ 2020-046855
Dec. 15, 2020 (JP) ................................ 2020-207971

(51) Int. Cl.
| | |
|---|---|
| *H04N 5/232* | (2006.01) |
| *G06F 3/16* | (2006.01) |
| *G10L 15/22* | (2006.01) |
| *H04R 1/08* | (2006.01) |
| *G02B 21/00* | (2006.01) |

(Continued)

(52) U.S. Cl.
CPC ......... *H04N 23/66* (2023.01); *G02B 21/0012* (2013.01); *G02B 21/245* (2013.01); *G02B 21/36* (2013.01); *G06F 3/167* (2013.01); *G10L 15/22* (2013.01); *H04N 23/959* (2023.01); *H04R 1/08* (2013.01); *G10L 2015/223* (2013.01)

(58) Field of Classification Search
CPC .............. G10L 15/22; G10L 2015/223; G02B 21/0012; G02B 21/36; G02B 21/361; G06F 3/167; H04N 5/232125
See application file for complete search history.

(56) References Cited

U.S. PATENT DOCUMENTS 4,989,253 A * 1/1991 Liang ................. G02B 21/0012
704/E15.045
5,345,538 A * 9/1994 Narayannan ............ G10L 15/26
704/E15.045

(Continued)

FOREIGN PATENT DOCUMENTS

| JP | 2001-175281 A | 6/2001 |
| JP | 2016-042982 A | 4/2016 |
| JP | 2016-42982 A | 4/2016 |

OTHER PUBLICATIONS

"High-speed variable-focus optical system for extended depth of field"—Ishikawa et al., 2009 IEEE International Symposium on Industrial Electronics; Date of Conference: Jul. 5-8, 2009. (Year: 2009).*

*Primary Examiner* — Mainul Hasan
(74) *Attorney, Agent, or Firm* — XSENSUS LLP (57) ABSTRACT

A control device includes circuitry configured to: acquire an operation command through voice input to an imaging device including: an image sensor; and an optical system including a focus lens; and proceed to a mode for performing control to return a position of the focus lens such that a focus position of the focus lens is returned, from a focus position at a time of stoppage of the focus lens, by an amount of return equal to or less than a reference focal depth in the optical system when the operation command is a command to stop operation of the focus lens.

20 Claims, 7 Drawing Sheets

(51) Int. Cl.
  *G02B 21/36* (2006.01)
  *G02B 21/24* (2006.01)
  *H04N 23/66* (2023.01)
  *H04N 23/959* (2023.01)

(56) References Cited

U.S. PATENT DOCUMENTS

| | | | |
|---|---|---|---|
| 11,048,072 B1* | 6/2021 | You | G06T 7/285 |
| 2013/0182127 A1* | 7/2013 | Yasuda | H04N 23/673 |
| | | | 348/240.1 |
| 2017/0212723 A1* | 7/2017 | Atarot | G10L 15/28 |
| 2020/0197122 A1* | 6/2020 | Kuramoto | H04N 23/66 |
| 2021/0149170 A1* | 5/2021 | Leshem | G02B 21/006 |

* cited by examiner

CONTROL DEVICE AND MEDICAL OBSERVATION SYSTEM

CROSS-REFERENCE TO RELATED APPLICATIONS

This application claims priority from Japanese Application No. 2020-046855, filed on Mar. 17, 2020 and Japanese Application No. 2020-207971, filed on Dec. 15, 2020, the contents of each are incorporated by reference herein in its entirety.

BACKGROUND

The present disclosure relates to a control device and a medical observation system.

When surgery, such as brain or heart surgery, is performed in a known medical observation system, an image of a surgical site that has been magnified is captured, and the captured image is displayed on a monitor (see, for example, Japanese Unexamined Patent Application, Publication No. 2016-42982). In this medical observation system, a microscope device has a focusing function.

When a user, such as a medical doctor, uses the focusing function to bring an image into focus, the user needs to operate a given switch. Operating the switch requires the user to stop the surgery briefly and change the user's position and is thus far from efficient. Thus, users may carry out various operations through voice input instead.

However, voice input requires time needed for a user to speak, time for transmission of the voice signal to a control device, time for the control device to recognize the content of the speech, and time for operation to be completed; and a delay from the time at which the user speaks is thus generated. Accordingly, when a user performs focus adjustment by voice input, for example, the focus lens will not stop at the position aimed by the user and the image will be unable to be in focus.

A technique for implementing processing intended by a user (see, for example, Japanese Unexamined Patent Application, Publication No. 2001-175281) may thus be used. In this technique, the time difference between the operation command time intended by the user and the time at which the operation command is actually given by the user is considered.

SUMMARY

The technique disclosed in Japanese Unexamined Patent Application, Publication No. 2001-175281 has a problem that the processing is complicated and puts a large load on the system.

There is a need for a control device and a medical observation system that enable focus adjustment by voice input by low-load and streamlined processing.

According to one aspect of the present disclosure, there is provided a control device including circuitry configured to: acquire an operation command through voice input to an imaging device including: an image sensor; and an optical system including a focus lens; and proceed to a mode for performing control to return a position of the focus lens such that a focus position of the focus lens is returned, from a focus position at a time of stoppage of the focus lens, by an amount of return equal to or less than a reference focal depth in the optical system when the operation command is a command to stop operation of the focus lens.

DETAILED DESCRIPTION

Modes for embodying the present disclosure (hereinafter, referred to as "embodiments") will be described below by reference to the appended drawings.

First Embodiment

Figure 1:
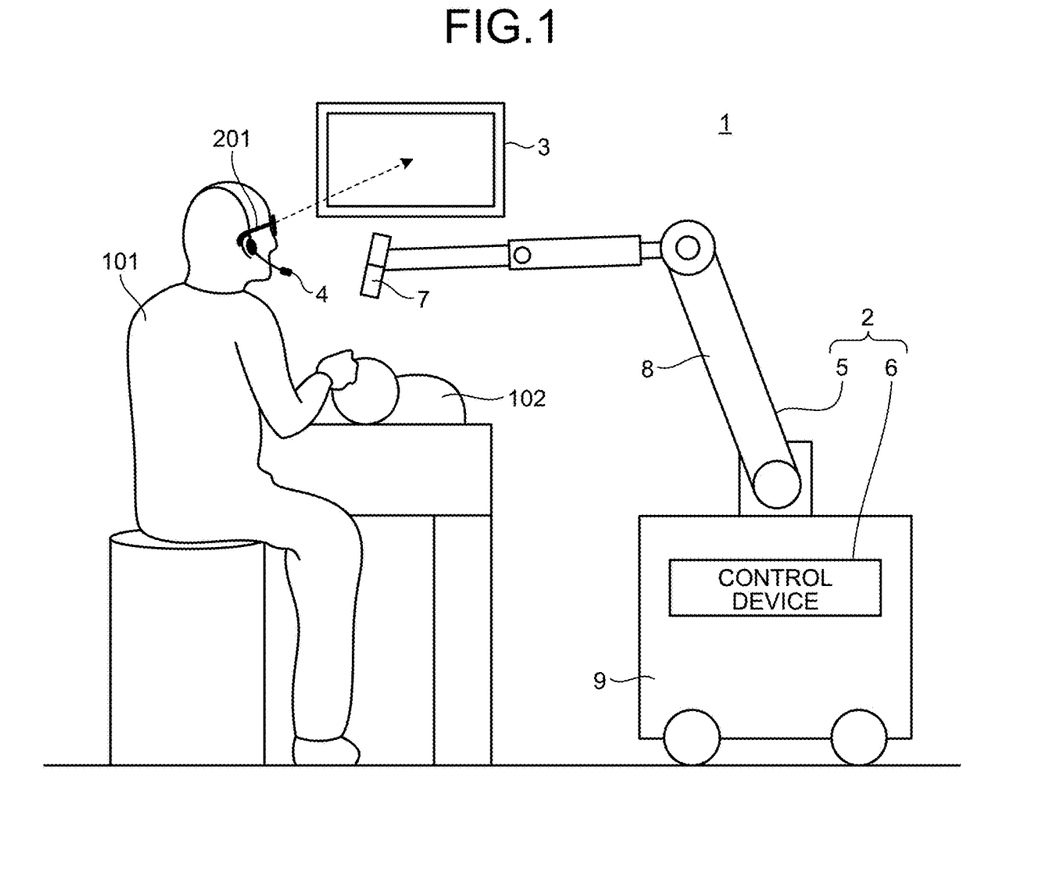
FIG. 1 is a diagram schematically illustrating a medical observation system according to a first embodiment.

FIG. 1 is a diagram schematically illustrating a medical observation system according to a first embodiment. FIG. 1 illustrates a setting where a user 101, such as a medical doctor, who performs surgery using a medical observation system 1, is performing surgery on the head of a patient 102. The medical observation system 1 illustrated in FIG. 1 includes a medical observation apparatus 2, a display device 3, and a microphone 4.

The medical observation apparatus 2 is a surgical microscope and includes a microscope device 5 and a control device 6. The microscope device 5 has functions of an imaging device that captures an image of a target to be observed and generates an image signal.

The display device 3 is communicably connected by wire or wirelessly to the control device 6, receives a three-dimensional image signal or two-dimensional image signal from the control device 6, and displays a three-dimensional image (3D image) based on the three-dimensional image signal or a two-dimensional image (2D image) based on the two-dimensional image signal. The display device 3 has a display panel formed of liquid crystal or organic electroluminescence (EL). The display device 3 displays an image of a surgical site in the patient 102, the image having been captured by the medical observation apparatus 2. FIG. 1 schematically illustrates a setting where the display device 3 is displaying a 3D image and the user 101 is wearing 3D glasses 201 to visually observe the 3D image.

The microphone 4 is connected to the control device 6 by wire or wirelessly for communication, receives voice input by the user 101 to generate a voice signal, and transmits the voice signal to the control device 6.

An exterior configuration of the microscope device 5 will be described below. The microscope device 5 has a microscope unit 7 that captures a magnified image of a microstructure of a target to be observed, a support unit 8 that supports the microscope unit 7, and a base unit 9 that holds a proximal end of the support unit 8 and has the control device 6 built therein.

The microscope unit 7 has a cylindrical portion that is cylindrical. A cover glass not illustrated in the drawings is provided on a plane of a lower end opening of a main body portion of the microscope unit 7. The cylindrical portion is able to be held by a user and has a size allowing the user to move the cylindrical portion while holding the cylindrical portion when the user changes the imaging field of the microscope unit 7. The shape of the cylindrical portion is not necessarily cylindrical and may be polygonally cylindrical.

The support unit 8 has plural links in an arm portion thereof, and adjacent ones of these links are connected to each other to be rotatable via a joint portion. The hollow formed inside the support unit 8 has therethrough: a transmission cable that transmits various signals between the microscope unit 7 and the control device 6; and a light guide that transmits illumination light generated by the control device 6, to the microscope unit 7.

The control device 6 acquires a voice signal generated by the microphone 4 and recognizes the content of the voice signal. For example, expressions for commanding focusing operation of the microscope device 5 are "focus in" and "focus out", and an expression for stopping the focusing operation of the microscope device 5 is "stop". When executing the focusing operation of the microscope device 5, the control device 6 is able to set up a return mode where a focus position of a focus lens 511 described later and included in the microscope device 5 is caused to return, from a focus position at the time of stoppage of the focus lens 511, in the opposite direction by a predetermined amount of return after the focusing operation is stopped according to voice input corresponding to a stop command. The above expressions for commanding the focusing operation through voice are just examples and any other expressions may be used.

Figure 2A:
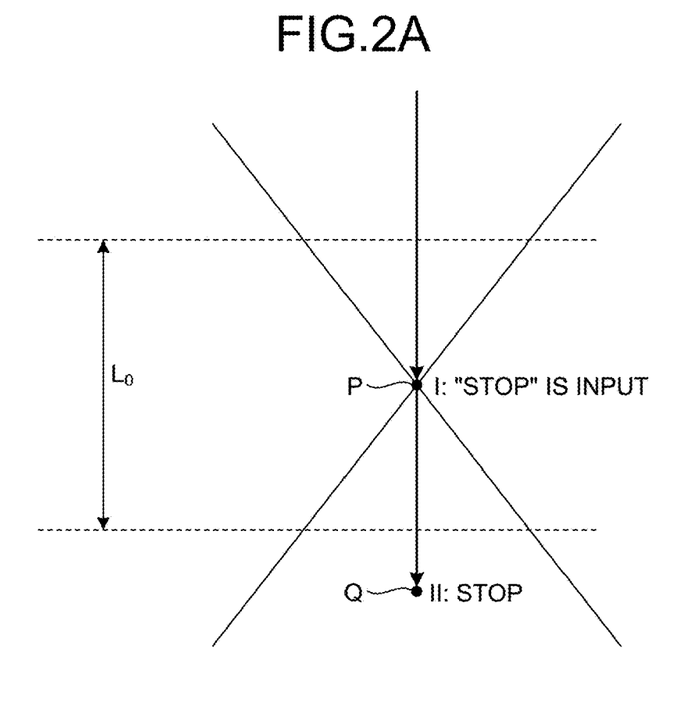
FIG. 2A is a diagram schematically illustrating movement of a focus position of a focus lens until the focus lens stops focusing operation.
Figure 2B:
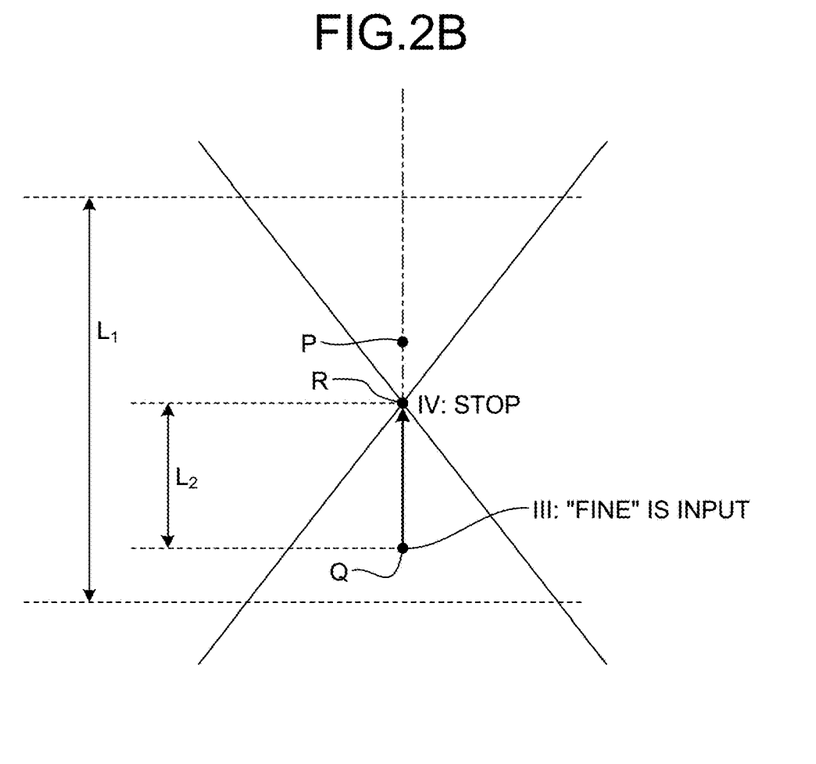
FIG. 2B is a diagram schematically illustrating movement of the focus position of the focus lens returning in the opposite direction after the focusing operation is stopped.

FIG. 2A and FIG. 2B are diagrams schematically illustrating the focusing operation in a case where the return mode has been set up. FIG. 2A schematically illustrates movement of the focus position of the focus lens 511 until the focus lens 511 stops the focusing operation. Furthermore, FIG. 2B schematically illustrates movement of the focus position of the focus lens 511 returning in the opposite direction after the focusing operation is stopped.

FIG. 2A will be described first. To stop the focusing operation, the user 101 performs voice input by saying "stop" to the microphone 4. FIG. 2A illustrates a case where the user 101 has performed the voice input by saying "stop" to the microphone 4 when the focus position of the focus lens 511 is positioned at a target position P that is an aimed focus position at which the focus lens 511 is desired to be stopped. After recognizing the voice signal acquired from the microphone 4, the control device 6 transmits a control signal that commands stoppage of the focusing operation, to the microscope device 5. As a result, there is a time difference between the time (I) when "stop" is input by the user 101 and the time (II) when the focus lens 511 stops, and the focus position Q at the time of stoppage of the focus lens 511 (herein after called the stop position Q) thus overruns from the target position P by that time difference. FIG. 2A illustrates a setting where the stop position Q is positioned outside a focal depth of a depth $L_0$ at a predetermined magnification, the depth $L_0$ being for a case where the focus position of the focus lens 511 is positioned at the target position P. In this case, an image that is out of focus is displayed on the display device 3. This predetermined magnification is higher than the center of a range of magnification available in the microscope device 5.

Next, FIG. 2B will be described below. FIG. 2B schematically illustrates movement of the focus position of the focus lens 511 in a case where voice, for example, "fine", of the user 101 commanding a return at the stop position Q has been input. In this case, the focus lens 511 moves in a direction opposite to the direction of movement in FIG. 2A. The amount of this movement of the focus position of the focus lens 511, that is, the amount of return $L_2$, is less than a depth $L_1$ of a focal depth for a case where the focus lens 511 is positioned at a stop position R of the focus position of the focus lens 511 after the return. If the amount of return $L_2$ is equal to or larger than a half of the depth $L_1$ of the focal depth ($L_2 \geq L_1/2$), the number of returns is able to be made small. In FIG. 2B, the target position P is inside the focal depth of the focus lens 511 at the stop position R. Therefore, the user 101 is able to determine that the focus lens 511 does not need to be returned any further. If the user 101 determines that the image corresponding to this setting is in focus when the user 101 looks at the image via the display device 3, the user 101 may end the focusing operation as is. If the user 101 determines that further adjustment is needed, the user 101 may perform voice input again by saying "fine" to the microphone 4.

If the above described depths $L_0$ and $L_1$ of the two focal depths are equal to each other and the stop position R is positioned within the focal depth (FIG. 2A) at the target position P, effects similar to those in the case illustrated in FIG. 2B are able to be achieved.

The above described expressions, "focus in", "focus out", "stop", and "fine", corresponding to various operational commands are just examples, and any other expressions may be adopted.

Figure 3:
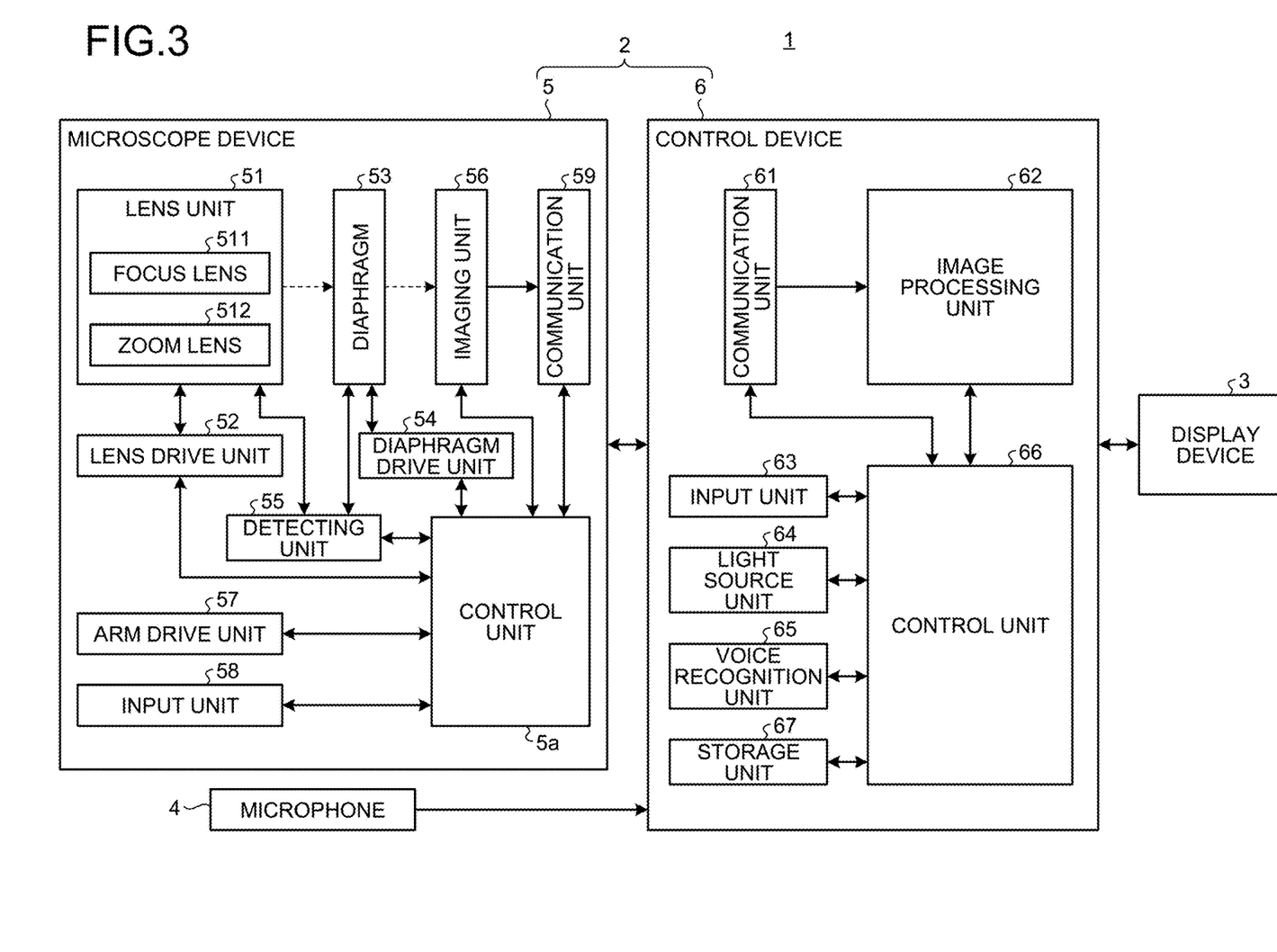
FIG. 3 is a block diagram illustrating a functional configuration of the medical observation system according to the first embodiment.

FIG. 3 is a block diagram illustrating a functional configuration of the medical observation system 1. A functional configuration of the microscope device 5 will be described first. The microscope device 5 includes a lens unit 51, a lens drive unit 52, a diaphragm 53, a diaphragm drive unit 54, a detecting unit 55, an imaging unit 56, an arm drive unit 57, an input unit 58, a communication unit 59, and a control unit 5a.

The lens unit 51 is an optical system that is formed using plural lenses movable along an optical axis and forms a condensed subject image on an imaging area of an imaging element included in the imaging unit 56. The lens unit 51 has the focus lens 511 for adjusting the focus and a zoom lens 512 for changing the angle of view. The focus lens 511 and the zoom lens 512 are each formed using one or plural lenses.

The lens drive unit 52 has an actuator that moves each of the focus lens 511 and the zoom lens 512 and a driver that drives the actuator, both under control by the control unit 5a.

The diaphragm 53 is provided between the lens unit 51 and the imaging unit 56 and adjusts the quantity of light of a subject image heading to the imaging unit 56 from the lens unit 51. The diaphragm 53 forms, together with the lens unit 51, an optical system of the microscope device 5.

The diaphragm drive unit 54 adjusts the aperture value, also called the f-number, by driving the diaphragm 53, under control by the control unit 5a.

The detecting unit 55 has, for example, two position sensors that respectively detect positions of the focus lens 511 and the zoom lens 512, and an encoder that detects the aperture value of the diaphragm 53. The detecting unit 55 outputs the detected position of the zoom lens 512 and the detected aperture value of the diaphragm 53, to the control unit 5a.

The imaging unit 56 has: an imaging element that forms a subject image condensed by the lens unit 51 and generates an image captured (an analog signal); and a signal processing unit that performs signal processing, such as noise removal and A/D conversion, on an image signal (the analog signal) from the imaging element. The imaging element is formed using an image sensor, such as a charge coupled device (CCD) or a complementary metal oxide semiconductor (CMOS). The imaging unit 56 may have two imaging elements. In this case, the imaging unit 56 is able to generate a three-dimensional image (3D image).

The arm drive unit 57 drives each of plural joints that the support unit 8 has, under control by the control unit 5a. Specifically, the arm drive unit 57 has: an actuator provided for the joint portions between arms; and a driver that drives the actuator.

The input unit 58 receives input of signals, such as an operation signal for the lens unit 51 and an operation signal for an arm of the support unit 8. The input unit 58 has, for example, plural switches or buttons provided at positions on a lateral surface of the cylindrical portion of the microscope unit 7, the positions allowing the plural switches or buttons to be operated in a state where a user is holding the microscope unit 7.

The communication unit 59 is an interface for communication with the control device 6. The communication unit 59 transmits an image signal (a digital signal) generated by the imaging unit 56, to the control device 6 and receives a control signal from the control device 6.

The control unit 5a controls operation of the microscope device 5 in cooperation with the control unit 66 of the control device 6. Based on an operation command signal input through the input unit 58 or an operation command signal transmitted from the control unit 66 of the control device 6, the control unit 5a causes the microscope device 5 to operate. In this embodiment, the control unit 5a receives, from the control unit 66 of the control device 6, a signal that causes the arms to move to shift the imaging field of the microscope device 5.

The control unit 5a is formed using at least one processor selected from a group of: central processing units (CPUs); field programmable gate arrays (FPGAs); and application specific integrated circuits (ASICs).

A functional configuration of the control device 6 will be described next. The control device 6 includes a communication unit 61, an image processing unit 62, an input unit 63, a light source unit 64, a voice recognition unit 65, a control unit 66, and a storage unit 67. The communication unit 61 acquires an image signal captured by the microscope device 5 and transmitted via the transmission cable. The image signal includes information related to imaging, such as a gain adjustment value, a focus lens position, a zoom lens position, a shutter speed, and an aperture value, for the imaging. Furthermore, the communication unit 61 acquires an operation command that is a voice signal input through the microphone 4 by the user 101. The communication unit 61 thus has functions of an acquiring unit.

The image processing unit 62 generates an image signal for display by performing various kinds of signal processing on the image signal acquired by the communication unit 61 and outputs the generated image signal to the display device 3. Specific examples of image processing include known examples of image processing, such as detection processing for brightness of the image signal, gain adjustment, interpolation processing, color correction processing, color enhancement processing, and contour enhancement processing. The image processing unit 62 is formed using at least one processor selected from a group of: CPUs; FPGAs; and ASICs.

The input unit 63 receives input of various kinds of information. The input unit 63 is formed using a user interface, such as a keyboard, a mouse, a touch panel, or a foot switch. The input unit 63 may also have at least a part of functions of the input unit 58 of the microscope device 5.

The light source unit 64 generates illumination light to be supplied to the microscope device 5 via the light guide. The light source unit 64 is formed using, for example, a solid-state light emitting element, such as a light emitting diode (LED) or a laser diode (LD), a laser light source, a xenon lamp, or a halogen lamp.

The voice recognition unit 65 executes recognition processing on a voice signal received from the microphone 4. The voice recognition unit 65 recognizes the content of the voice signal by comparing feature data of the voice signal with feature data stored in the storage unit 67.

The control unit 66 controls operation of the control device 6 and integrally controls, in cooperation with the control unit 5a of the microscope device 5, operation of the medical observation apparatus 2. The control unit 66 advances to a mode (the return mode) where control is performed, if the content of the voice signal recognized by the voice recognition unit 65 corresponds to a command to stop operation of the focus lens 511, the control including returning the position of the focus lens 511 such that the focus position of the focus lens 511 is returned, from the focus position at the time of stoppage of the focus lens 511, by an amount of return equal to or less than a reference focal depth in the optical system. When the control device 6 is set in the return mode, the control unit 66 generates, based on the content of the voice signal recognized by the voice recognition unit 65, a control signal that causes the microscope device 5 to operate and transmits the control signal to the microscope device 5. The reference focal depth may be a focal depth at the time of stoppage of the focus lens 511, but the reference focal depth may also be a focal depth at a position when receiving the command for stopping the focus lens 511 or a focal depth at an arbitrary position of the focus lens 511. The control unit 66 controls the shutter speed of the imaging unit 56, the gain adjustment performed by the image processing unit 62, and the quantity of the illumination light generated by the light source unit 64, to set the brightness of the image signal captured by the microscope device 5 at a predetermined brightness level. Furthermore, the control unit 66 controls display by the display device 3.

The control unit 66 is formed using at least one processor selected from a group of: CPUs; FPGAs; and ASICs. The image processing unit 62 and the control unit 66 may be formed using a processor or processors common thereto.

The storage unit 67 stores therein an amount of return in the return mode. This amount of return is preset according to a focal depth at a predetermined magnification. This predetermined magnification is higher than a magnification at the center of a range of magnification settable for the lens unit 51 of the microscope device 5. The amount of return may be equal to or less than a half of the focal depth.

The storage unit 67 stores therein various programs for the control device 6 to operate and temporarily stores therein data being arithmetically processed by the control device 6. The storage unit 67 is formed using, for example, one or both of a read only memory (ROM) and a random access memory (RAM).

Figure 4:
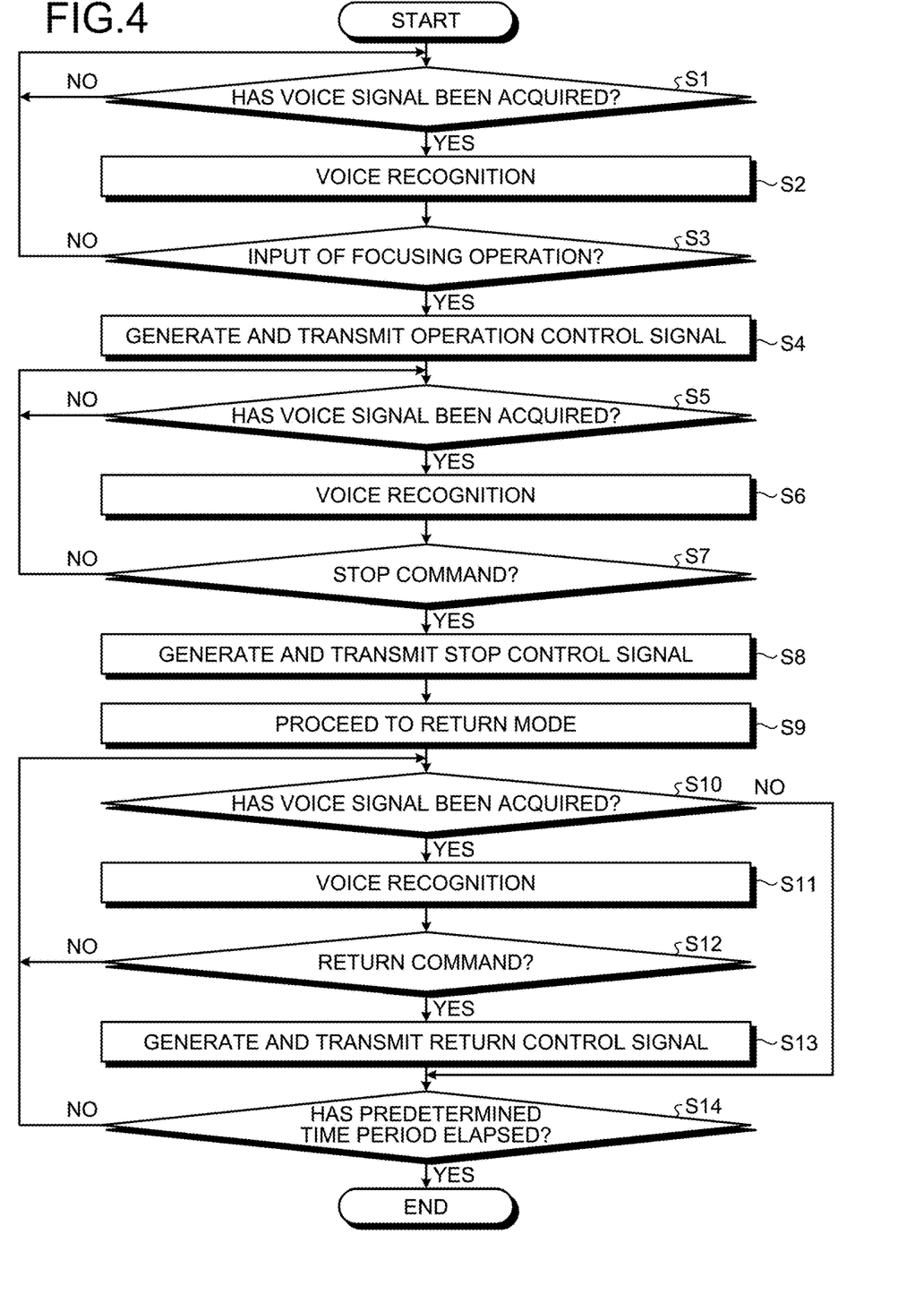
FIG. 4 is a flowchart illustrating an outline of processing performed by a control device according to the first embodiment.

FIG. 4 is a flow chart illustrating an outline of processing performed by the control device 6. In parallel with the processing described below, the control device 6 controls processing including: the communication unit 61 sequentially acquiring data on images captured by the imaging unit 56, from the microscope device 5; and the image processing unit 62 generating an image signal for display and outputting the image signal to the display device 3. This applies to all of the flowcharts described later.

Firstly, if the communication unit 61 has acquired a voice signal (Step S1: Yes), the voice recognition unit 65 performs recognition processing on the voice signal (Step S2). If the communication unit 61 has not acquired a voice signal at Step S1 (Step S1: No), the control device 6 repeats Step S1.

If, as a result of the recognition processing, the voice signal has been recognized to correspond to input of focusing operation, for example, if the voice signal corresponds to "focus in" or "focus out" (Step S3: Yes), the control unit 66 generates a control signal (an operation control signal) that causes the lens drive unit 52 of the microscope device 5 to operate and transmits the control signal to the control unit 5a (Step S4). The lens drive unit 52 thereby moves the focus lens 511, under control by the control unit 5a. If, as a result of the recognition processing, the voice signal has been recognized to not correspond to input of focusing operation (Step S3: No), the control device 6 returns to Step S1.

If, after Step S4, the communication unit 61 has acquired a voice signal (Step S5: Yes), the voice recognition unit 65 performs recognition processing on the voice signal (Step S6). If the communication unit 61 has not acquired a voice signal at Step S5 (Step S5: No), the control device 6 repeats Step S5. If, the communication unit 61 has not acquired a voice signal even if a predetermined time period has elapsed after Step S4, the control unit 66 may cause the display device 3 to display thereon information prompting the user 101 to perform voice input. The control unit 66 may output a message or an audible alarm prompting the user 101 to perform voice input, through a speaker.

If, as a result of the recognition processing at Step S6, the voice signal has been recognized as a command to stop the focusing operation, for example, if the voice signal corresponds to "stop" (Step S7: Yes), the control unit 66 generates a control signal (a stop control signal) that causes the operation of the lens drive unit 52 to be stopped and transmits the control signal to the control unit 5a (Step S8). The lens drive unit 52 thereby stops the focus lens 511, under control by the control unit 5a.

If, as a result of the recognition processing at Step S6, the voice signal has been recognized as not a command to stop the focusing operation (Step S7: No), the control device 6 returns to Step S5. If a command to stop the focusing operation has not been input even a predetermined period has elapsed after Step S4, the control unit 66 may cause the display device 3 to display thereon information prompting the user 101 to perform voice input. Again, the control unit 66 may output a message or an audible alarm prompting the user 101 to perform voice input, from a speaker provided separately.

After Step S8, the control unit 66 advances to a return mode (Step S9).

Thereafter, if the communication unit 61 has acquired a voice signal (Step S10: Yes), the voice recognition unit 65 performs recognition processing on the voice signal (Step S11). If, at Step S10, the communication unit 61 has not acquired a voice signal (Step S10: No), the control device 6 proceeds to Step S14, which will be described later.

If, as a result of the recognition processing at Step S11, the voice signal has been recognized as a return command, for example, if the voice signal corresponds to "fine" (Step S12: Yes), the control unit 66 generates a control signal (hereinafter, also referred to as a return control signal) that causes the focus lens 511 to be returned such that the focus position of the focus lens 511 to be returned, from the focus position at the time of stoppage of the focus lens 511, by a predetermined amount of return, and transmits the control signal to the control unit 5a (Step S13). The lens drive unit 52 thereby returns the position of the focus lens 511 in a direction opposite to the movement before the stoppage by the amount of return, under control by the control unit 5a.

If a predetermined time period has elapsed after Step S13 (Step S14: Yes), the control device 6 ends the processing. On the contrary, if the predetermined time period has not elapsed after Step S13 (Step S14: No), the control device 6 returns to Step S10.

If, as a result of the recognition processing at Step S11, the voice signal has been recognized as not a return command (Step S12: No), the control device 6 returns to Step S10.

According to the above described first embodiment, focus adjustment is able to be performed just by voice input because: the content of a voice signal acquired through a microphone that has received voice input by an operator of a medical observation apparatus including an imaging unit and an optical system including a focus lens is recognized; and if the content corresponds to a command to stop operation of the focus lens, control proceeds to a mode (the return mode) where position of the focus lens is returned such that the focus position of the focus lens 511 is retuned, from the focus position at the time of stoppage of the focus lens 511, by an amount of return equal to or less than a reference focal depth in the optical system. Therefore, focus adjustment by voice input is enabled by low-load and streamlined processing.

Furthermore, according to the first embodiment, even if a delay is generated from voice input, fine adjustment is possible just by voice input, and streamlined focus adjustment is thus enabled.

In addition, according to the first embodiment, by further making the amount of return equal to or larger than a half of the focal depth, the number of times fine adjustment is performed is able to be reduced.

Second Embodiment

In a second embodiment, an amount of return in a return mode is set based on a reference focal depth according to imaging conditions for imaging. A functional configuration of a medical observation system according to the second embodiment is the same as that of the first embodiment. The imaging conditions referred to herein are, for example, a magnification and an aperture value of the optical system.

In this second embodiment, the control unit 66 of the control device 6 extracts a reference focal depth based on a magnification and/or an aperture value of the diaphragm 53 according to positions of the focus lens 511 and zoom lens 512 at the time when the microphone 4 receives a voice signal commanding focusing operation, and sets an amount of return according to that depth. The magnification and the aperture value are detected by the detecting unit 55.

The storage unit 67 stores, in a table, the above mentioned reference focal depth according to the magnification and/or aperture value and stores a relation between the reference focal depth and the amount of return. For example, the storage unit 67 stores an amount of return that is any value in a range of 50% to 90% of the reference focal depth. The relation between the reference focal depth and the amount of return is able to be changed by the user 101 via the input unit 63.

Figure 5:
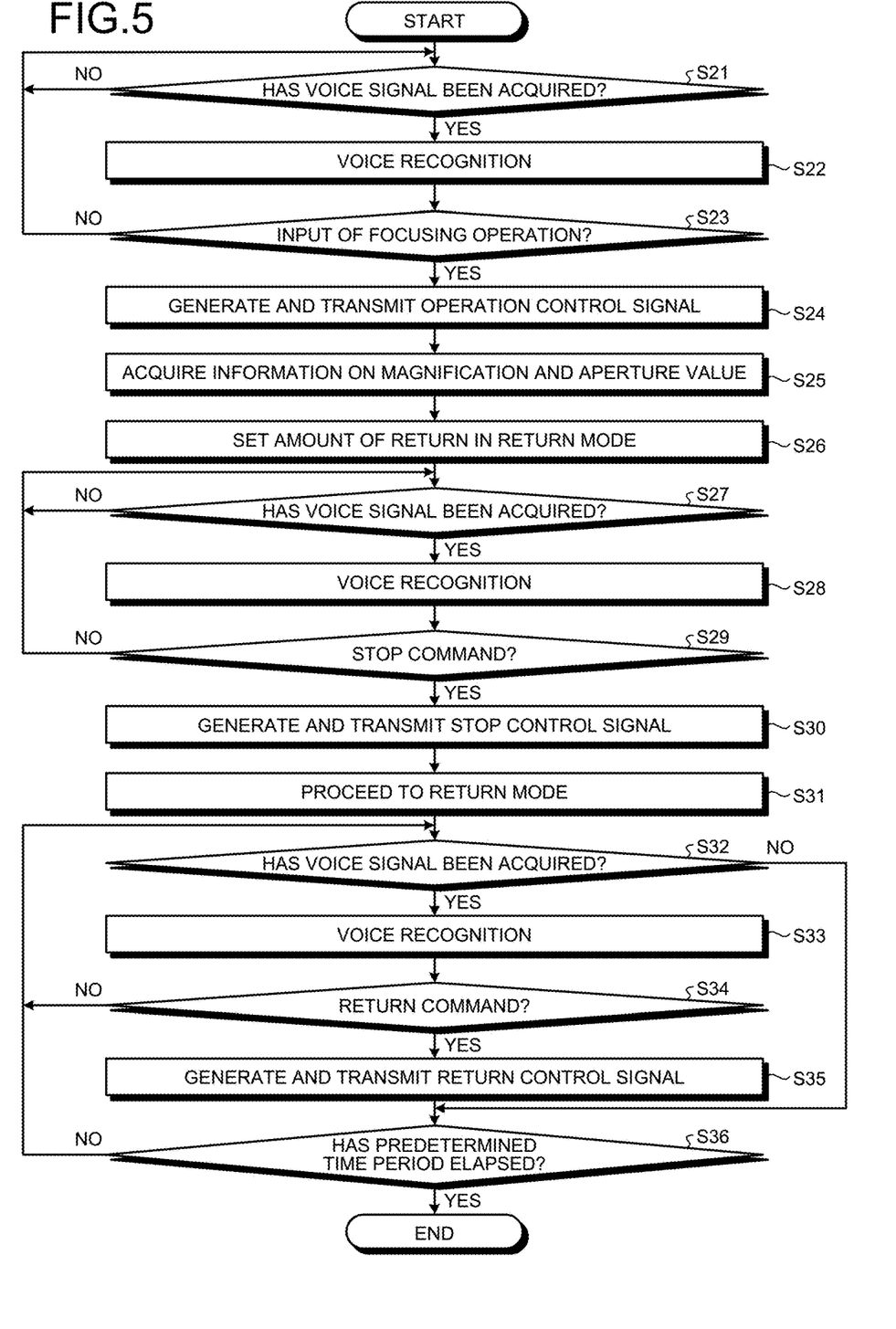
FIG. 5 is a flowchart illustrating an outline of processing performed by a control device according to a second embodiment.

FIG. 5 is a flowchart illustrating an outline of processing performed by a control device according to the second embodiment. Firstly, the processing from Step S21 to Step S24 sequentially correspond to the processing at Step S1 to Step S4 described with respect to the first embodiment.

After Step S24, the control unit 66 requests the microscope device 5 via the communication unit 61 for information on a magnification and an aperture value and acquires the information from the microscope device 5 (Step S25). The processing at Step S24 and Step S25 may be performed in the reverse order or may be performed in parallel with each other.

Subsequently, based on the information on the magnification and/or aperture value acquired, the control unit 66 refers to the table in the storage unit 67 and extracts the depth of the reference focal depth and sets, based on this depth and the relation between the reference focal depth and return amount stored in the storage unit 67, an amount of return for the return mode (Step S26).

The processing from Step S27 to Step S36 below sequentially correspond to the above described processing from Step S5 to Step S14. The amount of return of the focus position of the focus lens 511 at Step S35 is the amount of return set by the control unit 66 at Step S26.

According to the above described second embodiment, focus adjustment by voice input is able to be performed by low-load and streamlined processing, similarly to the first embodiment.

Furthermore, according to the second embodiment, since an amount of return is set according to a magnification and/or an aperture value for imaging, an amount of return matching imaging conditions, such as optical parameters, for imaging, is able to be set.

Third Embodiment

In a third embodiment, after a focus lens is stopped by a user's voice input, a position of the focus lens 511 is returned such that a focus position of the focus lens 511 is automatically returned, from a focus position when the focus lens is stopped, by a predetermined amount of return. This amount of return may be determined similarly to the first embodiment. A functional configuration of a medical observation system according to the third embodiment is the same as that of the first embodiment.

In this third embodiment, after stopping movement of the focus lens 511 according to input of a stop command through the microphone 4 by the user 101, the control unit 66 of the control device 6 performs control to return the position of the focus lens 511 such that the focus position of the focus lens 511 is automatically returned, from the focus position at the time of stoppage of the focus lens 511, by the predetermined amount of return.

Figure 6:
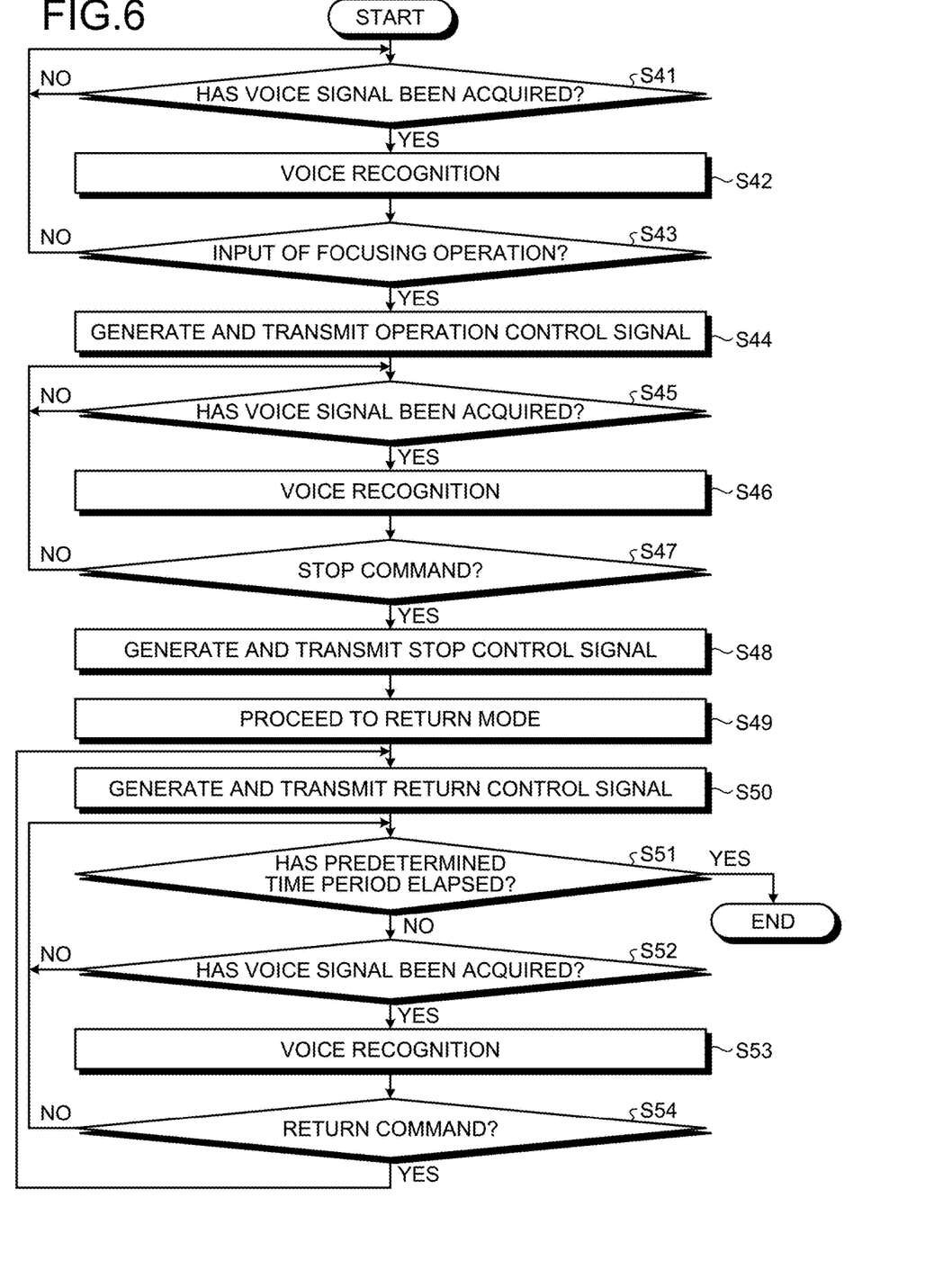
FIG. 6 is a flowchart illustrating an outline of processing performed by a control device according to a third embodiment.

FIG. 6 is a flowchart illustrating an outline of processing performed by a control device according to the third embodiment. In FIG. 6, the processing from Step S41 to Step S49 sequentially correspond to the processing from Step S1 to Step S9.

At Step S50, the control unit 66 generates a return control signal and transmits the return control signal to the control unit 5a (Step S50). This processing is automatically performed independently of voice input performed by the user 101.

Thereafter, if a predetermined time period has elapsed (Step S51: Yes), the control device 6 ends the processing.

A case where the predetermined time period has not elapsed at Step S51 (Step S51: No) will be described below. In this case, if the communication unit 61 has acquired a voice signal (Step S52: Yes), the voice recognition unit 65 performs recognition processing on the voice signal (Step S53). If, at Step S52, the communication unit 61 has not acquired a voice signal (Step S52: No), the control device 6 proceeds to Step S51.

If, as a result of the recognition processing at Step S53, the voice signal has been recognized as a return command (Step S54: Yes), the control device 6 returns to Step S50. On the contrary, if, as a result of the recognition processing at Step S53, the voice signal has been recognized as not a return command (Step S54: No), the control device 6 returns to Step S51.

According to the above described third embodiment, focus adjustment by voice input is able to be performed by low-load and streamlined processing, similarly to the first embodiment.

Furthermore, according to the third embodiment, since the focus position of the focus lens is automatically returned by a predetermined amount of return after the focus lens is stopped by a user's voice input, the number of times the operation through voice input is performed is able to be reduced.

In this third embodiment, an amount of return may be set based on a focal depth according to imaging conditions for imaging, such as a magnification and/or an aperture value, at the time when the control unit received input of a command for focusing operation, similarly to the second embodiment.

Furthermore, this third embodiment may enable a user to set whether or not to automatically return the focus lens after the focus lens is stopped by the user's voice input.

Fourth Embodiment

In a fourth embodiment, similarly to the second embodiment, a reference focal depth is extracted, and if this focal depth is less than a predetermined value, position of a focus lens is automatically returned after the focus lens is stopped in a return mode. A functional configuration of a medical observation system according to the fourth embodiment is the same as that of the first embodiment.

In this fourth embodiment, the control unit 66 of the control device 6 extracts, based on a magnification and/or an aperture value of the diaphragm 53, a reference focal depth, and sets an amount of return according to this depth, the magnification and the aperture value being according to positions of the focus lens 511 and zoom lens 512 detected by the detecting unit 55 when a voice signal commanding focusing operation is received by the microphone 4. Furthermore, the control unit 66 compares the reference focal depth with a predetermined value, and if the depth is less than the predetermined value, performs control to return the position of the focus lens 511 such that the focus position of the focus lens 511 is automatically returned, from the focus position at the time of stoppage of the focus lens 511, by a predetermined amount of return after stopping movement of the focus lens 511 according to input of a stop command through the microphone 4 by the user 101.

The storage unit 67 stores therein: in addition to the above described table of the reference focal depth corresponding to the magnification and/or aperture value and relation between the reference focal depth and amount of return; the predetermined value to be compared with the reference focal depth. This predetermined value is set based on a time period for input of voice through the microphone 4 by the user 101 and an amount of overrun (a distance between the target position P and the stop position Q in FIG. 2A) at the time of stoppage of the focus position of the focus lens 511, the amount of overrun being expected based on a delay in communication from the microphone 4. The predetermined value is set at a value that does not require the focus position of the focus lens 511 to be returned when the reference focal depth is larger than the predetermined value.

Figure 7:
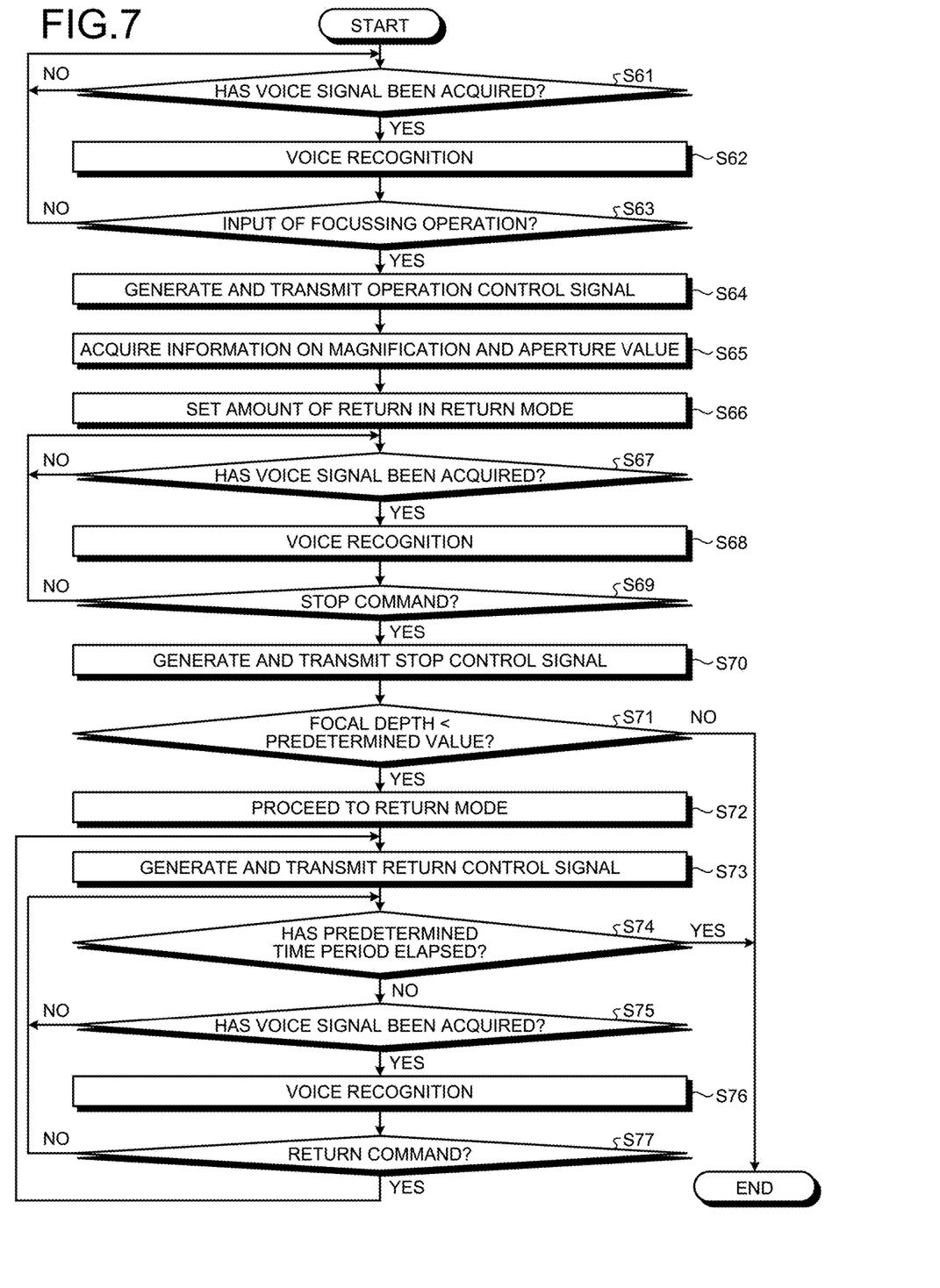
FIG. 7 is a flowchart illustrating an outline of processing performed by a control device according to a fourth embodiment.

FIG. 7 is a flowchart illustrating an outline of processing performed by a control device according to the fourth embodiment. The processing from Step S61 to Step S70 sequentially correspond to the processing at Step S21 to Step S30 described with respect to the second embodiment.

At Step S71, the control unit 66 compares the reference focal depth with the predetermined value. If the reference focal depth is less than the predetermined value (Step S71: Yes), the control unit 66 proceeds to the return mode (Step S72). On the contrary, if the reference focal depth is equal to or larger than the predetermined value (Step S71: No), the control device 6 ends the processing.

The processing from Step S73 to Step S77 sequentially correspond to the processing from Step S50 to Step S54 described with respect to the third embodiment.

According to the above described fourth embodiment, focus adjustment by voice input is able to be performed by low-load and streamlined processing, similarly to the first embodiment.

Furthermore, according to the fourth embodiment, if the reference focal depth is less than the predetermined value, the focus position of the focus lens is automatically returned by a predetermined amount of return, and if the depth is equal to or larger than the predetermined value, the processing is ended without the focus lens being returned. Therefore, unnecessary operation is able to be avoided when the focus lens is within the focal depth.

Other Embodiments

Some embodiments have been described above, but the present disclosure is not to be limited only to the above described first to fourth embodiments. For example, the present disclosure is not limited to focusing operation, and similar processing may be performed after stoppage of various functional members through voice input by a user for zoom operation or shifting of the field.

Furthermore, a medical observation apparatus according to the present disclosure may be an endoscope or exoscope including an imaging device.

The present techniques may also be embodied as follows.
(1)
A control device including
circuitry configured to:
acquire an operation command through voice input to an imaging device including: an image sensor; and an optical system including a focus lens; and
proceed to a mode for performing control to return a position of the focus lens such that a focus position of the focus lens is returned, from a focus position at a time of stoppage of the focus lens, by an amount of return equal to or less than a reference focal depth in the optical system when the operation command is a command to stop operation of the focus lens.

(2)
The control device according to (1), wherein the circuitry is configured to acquire, as the operation command, a voice signal generated by a microphone configured to receive the voice input.
(3)
The control device according to (1) or (2), wherein the circuitry is further configured to recognize content of the acquired operation command.
(4)
The control device according to any one of (1) to (3), wherein the amount of return is equal to or larger than a half of the reference focal depth.
(5)
The control device according to (1) or (2), wherein the reference focal depth is a focal depth according to a magnification higher than a magnification at the center of a settable range of magnification for the optical system.
(6)
The control device according to any one of (1) to (5), wherein the reference focal depth is a focal depth according to an imaging condition for imaging by the image sensor.
(7)
The control device according to (6), wherein the imaging condition is a magnification of the optical system.
(8)
The control device according to (6), wherein the imaging condition is an aperture value of the optical system.
(9)
The control device according to any one of (6) to (8), wherein the circuitry is configured to set the amount of return based on the reference focal depth according to the imaging condition.
(10)
The control device according to (9), wherein the reference focal depth is a focal depth at the time of stoppage of the focus lens.
(11)
The control device according to (9), wherein the reference focal depth is a focal depth at a position of the focus lens where the stop command was input.
(12)
The control device according to any one of (1) to (11), wherein the circuitry is configured to return the position of the focus lens such that the focus position of the focus lens is returned by the amount of return in response to receiving a return command as the operation command after proceeding to the mode.
(13)
The control device according to any one of (1) to (12), wherein the circuitry is configured to return the position of the focus lens such that the focus position is automatically returned by the amount of return after proceeding to the mode.
(14)
The control device according to any one of (1) to (13), wherein the circuitry is configured to proceed to the mode when the operation command has content to stop the operation of the focus lens and the reference focal depth is less than a predetermined value.
(15)
A medical observation system including:
an imaging device including:
an image sensor; and
an optical system including a focus lens;
circuitry configured to:
acquire an operation command through voice input to the imaging device; and proceed to a mode for performing control to return a position of the focus lens such that a focus position of the focus lens, from a focus position at a time of stoppage of the focus lens, by an amount of return equal to or less than a reference focal depth in the optical system when the operation command is a command to stop operation of the focus lens; and a display configured to display thereon an image captured by the imaging device.

According to the present disclosure, focus adjustment by voice input is enabled by low-load and streamlined processing.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control device comprising
circuitry configured to:
    acquire an operation command through voice input to an imaging device including: an image sensor; and an optical system including a focus lens; and
    proceed to a mode for performing control to return a position of the focus lens such that a focus position of the focus lens is returned, from a focus position at a time of stoppage of the focus lens, by an amount of return equal to or less than a reference focal depth in the optical system when the operation command is a command to stop operation of the focus lens,
    wherein the reference focal depth is a focal depth according to a magnification higher than a magnification at a center of a settable range of magnification for the optical system.

2. The control device according to claim 1, wherein the circuitry is configured to acquire, as the operation command, a voice signal generated by a microphone configured to receive the voice input.

3. The control device according to claim 1, wherein the circuitry is further configured to recognize a content of the acquired operation command.

4. The control device according to claim 1, wherein the amount of return is equal to or larger than half of the reference focal depth.

5. The control device according to claim 1, wherein the reference focal depth is a focal depth according to an imaging condition for imaging by the image sensor.

6. The control device according to claim 5, wherein the imaging condition is a magnification value of the optical system.

7. The control device according to claim 5, wherein the imaging condition is an aperture value of the optical system.

8. The control device according to claim 5, wherein the circuitry is configured to set the amount of return based on the reference focal depth according to the imaging condition.

9. The control device according to claim 8, wherein the reference focal depth is a focal depth at the time of stoppage of the focus lens.

10. The control device according to claim 8, wherein the reference focal depth is a focal depth at a position of the focus lens where the stop command was input.

11. The control device according to claim 1, wherein the circuitry is configured to return the position of the focus lens such that the focus position of the focus lens is returned by the amount of return in response to receiving a return command as the operation command after proceeding to the mode.

12. The control device according to claim 1, wherein the circuitry is configured to return the position of the focus lens such that the focus position is automatically returned by the amount of return after proceeding to the mode.

13. The control device according to claim 1, wherein the circuitry is configured to proceed to the mode when the operation command has content to stop the operation of the focus lens and the reference focal depth is less than a predetermined value.

14. A medical observation system comprising:
an imaging device including:
    an image sensor; and
    an optical system including a focus lens;
circuitry configured to:
    acquire an operation command through voice input to the imaging device; and
    proceed to a mode for performing control to return a position of the focus lens such that a focus position of the focus lens, from a focus position at a time of stoppage of the focus lens, by an amount of return equal to or less than a reference focal depth in the optical system when the operation command is a command to stop operation of the focus lens; and
a display configured to display thereon an image captured by the imaging device,
wherein the reference focal depth is a focal depth according to a magnification higher than a magnification at the center of a settable range of magnification for the optical system.

15. A method for a control device, comprising:
acquiring, with circuitry, an operation command through voice input to an imaging device, the imaging device including an image sensor and an optical system including a focus lens;
proceeding to a mode to perform control to return a position of the focus lens such that a focus position of the focus lens is returned, from a focus position at a time of stoppage of the focus lens, by an amount of return equal to or less than a reference focal depth in the optical system when the operation command is a command to stop operation of the focus lens,
wherein the reference focal depth is a focal depth according to a magnification higher than a magnification at the center of a settable range of magnification for the optical system.

16. The method according to claim 15, further comprising acquiring, as the operation command, a voice signal generated by a microphone configured to receive the voice input.

17. The method according to claim 15, further comprising recognizing a content of the acquired operation command.

18. The method according to claim 15, wherein the amount of return is equal to or larger than half of the reference focal depth.

19. The method according to claim 1, wherein the reference focal depth is a focal depth according to an imaging condition for imaging by the image sensor, and the imaging condition includes at least one of a magnification value or an aperture value of the optical system.

20. The method according to claim 15, further comprising proceeding to the mode when the operation command has content to stop the operation of the focus lens and the reference focal depth is less than a predetermined value.

* * * * *